Figure 1:
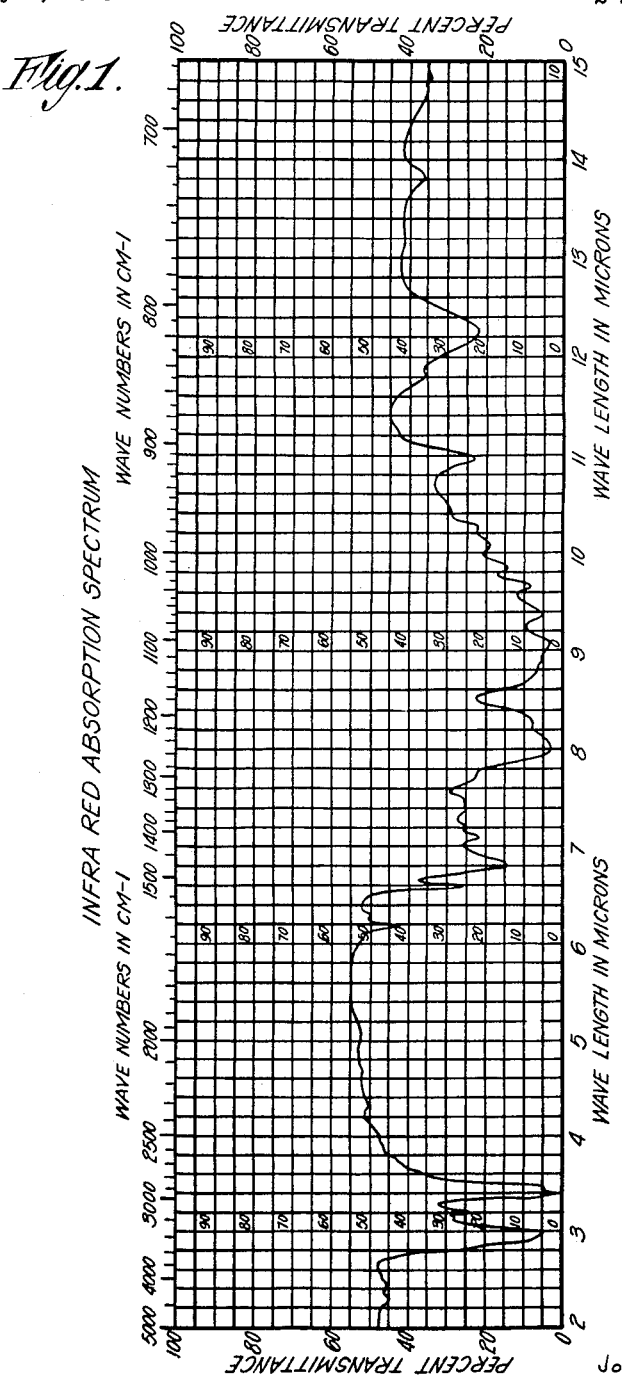

Inventors
John T. Macht
Charles M. Finigan
By Stevens, Davis, Miller & Mosher
Attorneys

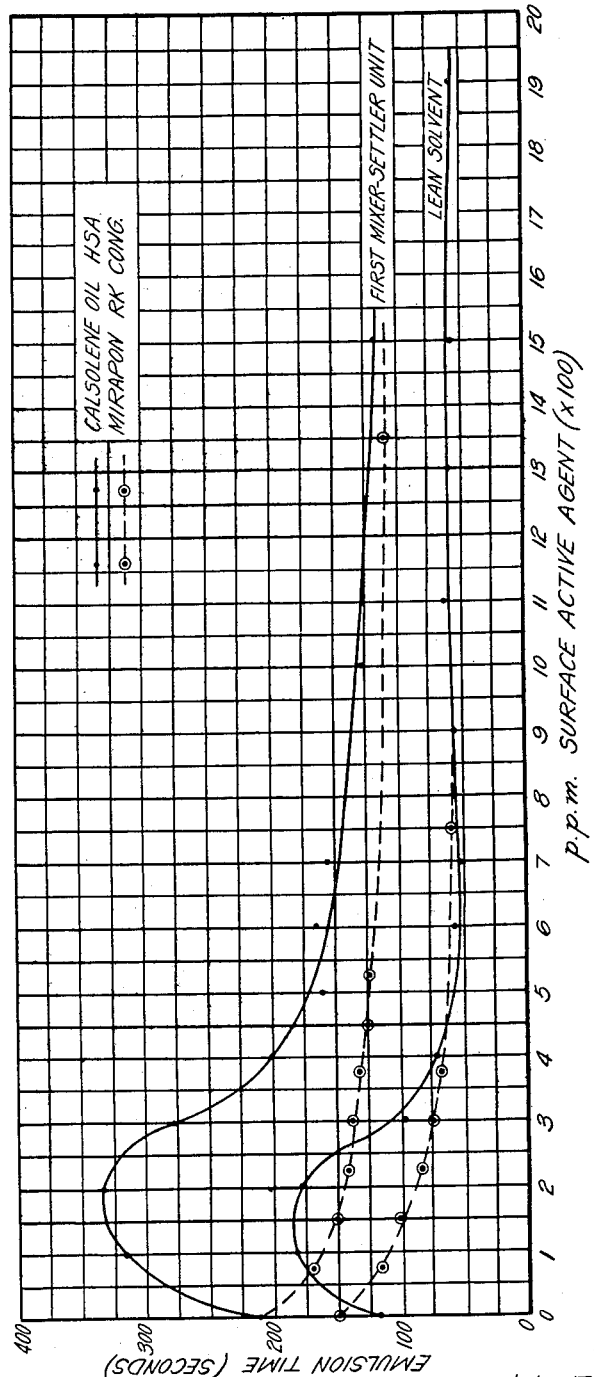

3,062,907
ANTI-EMULSION AGENTS IN THE SEPARATION OF OLEFINS
John T. Macht, 830 Elmhurst St., and Charles M. Finigan, 493 Lake Shore Road, both of Sarnia, Ontario, Canada
Filed July 6, 1959, Ser. No. 825,182
8 Claims. (Cl. 260—681.5)

This invention relates to certain anti-emulsion agents particularly suited for preventing emulsion formation and for breaking emulsions in a specific industrial application. This application is a continuation-in-part of our copending and now abandoned application Serial No. 597,695, filed July 13, 1956.

It is now well known that butadiene-1,3 is an especially valuable commercial chemical since it can be polymerized either alone or together with other materials to form a variety of polymeric materials; an example is the copolymerization of butadiene-1,3 and styrene to form a synthetic rubber known as GR–S. Butadiene-1,3 may be conveniently formed by the dehydrogenation of n-butylene using, for example, a calcium nickel phosphate catalyst, of the type disclosed in United States Patent No. 2,442,320, issued May 25, 1948, to Andrew J. Dietzler et al., in the presence of steam. The product of the dehydrogenation usually contains about 18 to 25 weight percent butadiene-1,3 with the remainder being unreacted in n-butylene and other hydrocarbons. In order to obtain substantially pure butadiene-1,3 for use as a polymerizable monomer, it is therefore necessary to separate the butadiene-1,3 from the contaminants.

One satisfactory method of separating olefinic hydrocarbons containing at least four atoms in the olefinic chain from other hydrocarbons, for example, separating butadiene-1,3 from other hydrocarbons, is a countercurrent solvent extraction such as the one disclosed in U.S. Patent 2,459,451 to Packie et al. The mixture of hydrocarbons is first thoroughly mixed in a mixing chamber with a preferential solvent for the hydrocarbon being separated; a suitable solvent is an ammoniacal solution of copper ions with an anion capable of forming cuprous salts soluble in the ammoniacal solution. Anions which have been suggested as being suitable include sulfate, phosphate, acetate, lactate, tartrate, formate, borate, carbonate, chloride, fluoride, glycolate, thioglycolate, salicylate, benzene sulfonate, orthophosphate, cyanide, thiocyanate, maleate, etc. One example of such solvent which was enjoyed widespread use is aqueous copper ammonium acetate. The mixture is then passed to a settling chamber where the hydrocarbon-enriched solvent separates from the hydrocarbons.

A more complete outline of the process of extracting butadiene-1,3 with aqueous copper ammonium acetate solvent may be represented in the following manner. Conventionally, the process is carried out in a series of mixers and settler tanks with each mixer having an associated settler tank. The point of entry of the aqueous copper ammonium acetate solvent is usually at one end of this series, while the point of entry of the butadiene-1,3 containing hydrocarbon stream is conventionally at a mixer-settler unit located at a point intermediate the point of entry of the aqueous copper ammonium acetate solvent and the opposite end of the mixer-settler chain. The direction of flow of the hydrocarbon stream is counter-current to the direction of flow of the aqueous copper ammonium acetate solvent. Thus the butadiene-1,3-containing liquid hydrocarbon stream which is being subjected to extraction is thoroughly mixed with the aqueous copper ammonium acetate solvent in a mixer at the point of entry of the hydrocarbon into the extraction chain. The mixture is pumped from the mixer to its adjoining settler tank, where the two phases are allowed to separate. The upper, or hydrocarbon, phase goes to the next mixer-settler unit in the direction of the point of entry of the aqueous copper ammonium acetate solvent where it is further extracted with fresher solvent. The lower, or solvent, phase goes to the next mixer-settler unit in the direction away from the point of entry of the aqueous copper ammonium acetate solvent, where it is used to extract separated hydrocarbon obtained from a settler further removed down the chain. The temperature becomes higher in each unit in the direction of flow of the aqueous copper ammonium acetate solvent. This serves to raise the purity of the butadiene-1,3 dissolved in the solvent and to increase the concentration of butadiene-1,3 in the hydrocarbon phase by rejecting more dissolved butadiene-1,3 and other hydrocarbons from the aqueous copper ammonium acetate phase to the hydrocarbon phase. Since the direction of flow of the hydrocarbon stream is counter-current to that of the aqueous copper ammonium acetate solvent stream, it is evident that the butadiene-1,3 content of the hydrocarbon phase is lowest in the settler tank nearest to the point of entry of the solvent into the mixer-settler chain, and highest in the settler furthest removed.

It has been found, however, that the rate of separation of the hydrocarbon-enriched solvent from the hydrocarbon in the settler tanks was slow, because of the presence of emulsions.

It is therefore an object of the present invention to disclose anti-emulsion agents which are suitable in the breaking of emulsions and in the inhibition of emulsion formation in a system comprising a hydrocarbon phase and a hydrocarbon-enriched solvent phase, such solvent being an aqueous ammoniacal solution of copper ions with an anion capable of forming copper salts soluble in such ammoniacal solution.

It is a more particular object of the present invention to provide an anti-emulsion agent suitable for the breaking of emulsions and for the inhibition of emulsion formation in a system consisting of a phase comprising $C_4$ hydrocarbons which may contain either low or high concentrations of butadiene-1,3, and a phase comprising an aqueous ammoniacal solution of copper acetate containing dissolved butadiene-1,3.

These and other objects of the present invention are achieved in the process of separating an olefin having at least four carbon atoms in the olefinic chain from a mixture of said olefin and other olefinic and saturated hydrocarbons (for example separating butadiene-1,3 from a mixture of butadiene-1,3 and other olefinic and saturated hydrocarbons such as, n-butylene, butanes and isobutylene), and which includes the steps of intimately mixing the hydrocarbon mixture with a solvent comprising an ammoniacal solution of copper ions with an anion capable of forming cuprous salts soluble in said ammoniacal solution (for example an aqueous copper ammonium acetate solvent), and allowing the mixture of solvent and hydrocarbon to separate into a hydrocarbon phase and an olefin-enriched solvent phase in a settler tank (for example into one phase comprising liquified n-butylene, isobutylene and butanes and another phase comprising a butadiene-1,3-enriched aqueous copper ammonium acetate solvent), by the improvement which comprises effecting such separation in the settler tank in the presence of an anionic surface active agent derived from a fatty acid containing 5–25 carbon atoms and a maximum of 3 olefinic linkages and active agent selected from the group consisting of (i) fatty alcohol amine sulfates; (ii) nitrogen containing salts of alcohol sulfates; and (iii) sulfonated fatty acid (which contains 5–25 carbon atoms) amide derivative. Of the anionic surface active agents found to be effective in the present invention, the following are preferred in the practice of this invention:

(1) Fatty alcohol amine sulfates, e.g., the triethanolamine salt of lauryl alcohol sulfate, or triethanolamine lauryl sulfate, (2) The nitrogen containing salts of alcohol sulfates, e.g., the ammonium salt of lauryl alcohol sulfate, ammonium lauryl sulfate, or the triethanolamine salt of lauryl alcohol sulfate; and (3) The sulfonated fatty acid amide derivatives, either alone or the sulfonated fatty acid amide mixed with an aryl alkyl sulfate and having an infra-red spectrum similar to that shown in the graph of FIG. 1.

In this specification, the terms anionic, non-ionic and cationic are used in their accepted meanings. Thus, the anionic compounds are those which are ionized in solution with the active portion of the molecule being negatively charged and moving in solution towards the anode. The anionics consist principally of the sulfated and sulfonated compounds which can be subdivided into the following categories: alkyl-aryl sulfonates; alkyl sulfates; sulfated and sulfonated amines and amides; sulfated and sulfonated esters and ethers; alkyl sulfonates; and miscellaneous types.

The cationic compounds are those in which the active part of the molecule is positively charged and hence moves in solutions towards the cathode. The cationics generally are weak in detergent power but mainly have strong lubricating and germicidal properties. They fall into two main classes: acid neutralized tertiary amine salts; and quaternary ammonium compounds.

Those compounds which do not ionize in solution are known as non-ionics. They are generally insoluble in water and are chiefly emulsifying agents. The two main types are esters and ethers, the ether sometimes being present in a group of polyalcohols on ethylene oxide. The hydrophobic part of the chain may be an acid, alcohol, phenol, amide or amine.

Before illustrating the present invention by reference to examples, test I will be described in which various agents were tested for anti-emulsion activity under conditions similar to actual commercial operating conditions. The following procedure was used in carrying out the test:

A specific amount of the solvent, an example of which is copper ammonium acetate, is agitated at 8° F. with $C_4$ hydrocarbons for two minutes. The top level of the emulsion is read immediately, and the time in seconds recorded for the top level to drop to the half-volume mark of the emulsion. That length of time is known as the "emulsion time" of the $C_4$ hydrocarbon used. In order to determine the effect of the anti-emulsion agent, the required amount of anti-emulsion agent is added to the solvent prior to the agitation thereof with the same $C_4$ hydrocarbons. The emulsion time is then an indication of the emulsion breaking tendency of the anti-emulsion agent.

The emulsion times for 97 surface active compounds so tested, using various concentrations of such compounds are given in Table I, below. The name in parentheses indicates the manufacturer of the trade named product. The initial solvent emulsion time is 135 seconds.

TABLE I

*Evaluation of Surface Active Agents for Breaking Emulsions in Copper Ammonium Acetate-Hydrocarbon Mixtures*

SURFACE ACTIVE AGENT
Non-Ionic

| Concentration (p.p.m. on solvent) | | | 100 | 500 | 1,000 |
|---|---|---|---|---|---|
| No. | Trade name | Chemical composition | Emulsion time (seconds) | | |
| 1 | Alrosol B (Alrose Chemical Co.). | Fatty alkylol amide condensate. | 300 | | |
| 2 | Alrosol C (Alrose Chemical Co.). | ----do---- | 200 | | 300 |
| 3 | Antarox 400 (Antara Chemicals DW. General Dyestuff Corp.). | Alkyl aryl polyoxy ethylene glycol. | 300 | | |
| 4 | Atlosene 500–C (Atlas Refinery Inc.). | Fatty alkylol amide condensate. | 300 | | |
| 5 | Atlox 1096 (Atlas Powder Co.). | Polyoxyethylene fatty esters. | 387 | | 300 |
| 6 | D-Sperso-W (Planetary Chemical Co.). | Polyglycol, fatty acid, sodium sulfosuccinic acid condensate. | 266 | | 300 |
| 7 | Nil | Dodecyl alcohol | 150 | 120 | 120 |
| 8 | Emulphor VN–430 (General Dyestuff Corp.). | Polyoxyethylated fatty acid. | 160 | | 300 |
| 9 | Emulphor EL–719 (General Dyestuff Corp.). | Polyoxyethylated vegetable oil. | 165 | | 300 |
| 10 | Emulsifier 610–A (Victor Chemical Works). | Polyoxyethylene glycol fatty acid ester. | 300 | | |
| 11 | Energetic (Armour and Co.). | Polyoxyethylene ester of fatty acids. | 300 | | |
| 12 | Hydroterg B (Hydrocarbon chemicals Inc.). | Fatty alkanol amide. | 200 | | |
| 13 | Igepal CA–630 (General Dyestuff Corp.). | Iso-octyl phenoxy polyoxyethylene alcohol. | 300 | | |
| 14 | Kessco 23201 (Kessler Chemical Co.). | Polyglycol ether ester of fatty acids. | 130 | 175 | 230 |
| 15 | Nonic-218 (Sharples Chemicals Inc.). | Polyethylene glycol tertdodecyl thioether. | 300 | | |
| 16 | Nonisol 100 (Alrose Chemical Co.). | Polyethylene glycol of lauric acid. | 230 | | 300 |
| 17 | Permolene A–122 (Refined Products Corp.). | Fatty amide condensate, fatty esters and salts of fatty alcohol sulfates. | 240 | | 220 |
| 18 | Pluronic L–62 (Wyandotte Chemical. Corp.). | Ethylene oxide, propylene oxide, condensate. | 300 | | |
| 19 | Siponic AP (American Alcolac Corp.). | Alkylphenol ether | 300 | | |
| 20 | Sterox–CD (Monsanto Chemical Co.). | Polyoxyethylene ester. | 180 | | 190 |
| 21 | Sterox SK (Monsanto). | Polyoxyethylene thioether. | 150 | | 300 |
| 22 | Surfynol 82 (Air Reduction Chemical Co.). | Ditertiary acetylenic glycols. | 170 | 130 | 120 |
| 23 | Surfynol 102 (Air Reduction Chemical Co.). | ----do---- | 140 | 120 | 125 |
| 24 | Surfynol 104 (Air Reduction Chemical Co.). | ----do---- | 160 | 165 | 169 |
| 25 | Synthetics AD–160 (Hercules Powder Co.). | Polyethylene glycol ether of hydroabietyl alcohol. | 300 | | |
| 26 | Tween 20 (Atlas Powder Co.). | Polyoxyethylene sorbitan monolaurate. | 300 | | |
| 27 | Tween 81 (Atlas Powder Co.). | Polyoxyethylene sorbitan monooleate. | 300 | | |

Cationic

| | | | | | |
|---|---|---|---|---|---|
| 28 | Alkaterge–C (Commercial Solvents Corp.). | Substituted oxazoline. | 200 | | 300 |
| 29 | Katapol VP–532 (Atlas Powder Co.). | Alkyl polyoxyethylene glycol amine. | 140 | | 300 |
| 30 | Miranol–OH (Miranol Chemical Co.). | Lauroyl imidazolene hydroxy acetate. | 300 | | |
| 31 | Negamine–142A (Synthetic Chemicals Inc.). | Amine ester of long chain fatty acid. | 240 | | 300 |
| 32 | Quatronyx (Onxy Oil and Chemical Co.). | Alkyl dimethyl carboxy methyl ammonium chloride. | 215 | | 300 |

SURFACE ACTIVE AGENT—Continued

Anionics—Alkyl, Aryl, Sulfonates and Sulfates

| No. | Trade name | Chemical composition | Emulsion time (seconds) 100 | 500 | 1,000 |
|---|---|---|---|---|---|
| 33 | Ahcowet ANS (Arnold Hoffman and Co.). | Alkyl aryl sodium sulfonate. | 220 | ------ | 180 |
| 34 | Alkanol WXN (E. I. du Pont de Namours & Co.) | Sodium alkylaryl sulfonate. | 215 | ------ | 285 |
| 35 | Alrosperse 40K (Alrose Chemical Co.). | Alkyl naphthalene sodium sulfonate. | 290 | ------ | 285 |
| 36 | Aresklene 375 (Monsanto Chemical Co.). | Dibutyl phenyl phenol sodium disulfonate. | 220 | ------ | 300 |
| 37 | Dianol 11 (Quaker Chemical Products Corp.). | Alkyl aryl sulfonate. | 265 | ------ | 300 |
| 38 | Dexolene B (Dexter Chemical Corp.). | Sodium dioctyl sulfosuccinate. | 205 | ------ | 200 |
| 39 | Dexolene G (Dexter Chemical Corp.). | ---do--- | 195 | ------ | 175 |
| 40 | Dexolene MTN (Dexter Chemical Corp.). | ---do--- | 300 | ------ | ------ |
| 41 | Merpentine (E.I. du Pont de Nemours & Co.) | Alkyl naphthalene sulfonate. | 170 | ------ | 200 |
| 42 | Morcowet 469 (Morton Withers Chemical Co.). | ---do--- | 220 | ------ | 300 |
| 43 | Moropon—DB (Moretex Chemical Products). | Amine alkyl aryl sulfate. | 225 | ------ | 190 |
| 44 | Naxonate 4L (Wyandotte Chemical Corp.). | Sodium xylene sulfonate. | 135 | ------ | 130 |
| 45 | Nekal NF (Monsanto Chemical Corp.). | Alkyl naphthalene sulfonate. | 155 | ------ | 300 |
| 46 | Neomerpin (E.I. du Pont de Nemours & Co.). | ---do--- | 160 | ------ | 190 |
| 47 | Neomerpin N (E.I. du Pont de Nemours & Co.). | Alkylated naphthalene sulfonic acid. | 160 | ------ | 215 |
| 48 | Ninex 300 (Ninol Laboratories Inc.). | Alkyl aryl sodium sulfonate. | 180 | ------ | 150 |
| 49 | Santomerse 30X (Monsanto Chemical Co.). | ---do--- | 180 | ------ | 150 |
| 50 | Sulfanole KA (Warwick Chemical Co. Dw. San Chemical Corp.). | Alkyl aryl sulfonate. | 255 | ------ | 260 |
| 51 | Sulframin KE (Ultra Chemical Works). | ---do--- | 170 | ------ | 255 |
| 52 | Titazole SA (Titan Chemical Products, Inc.). | Sodium aryl naphthalene sulfonate. | 160 | ------ | 165 |
| 53 | Triton X-200 (Rohm and Haas Co.). | Sodium salt of alkyl aryl polyester sulfonate. | 280 | ------ | 300 |
| 54 | Triton W-30 Conc. (Rohm and Haas Co.). | Alkyl aryl polyether sulfate isopropanol. | ------ | ------ | ------ |

Sulfated or Sulfonated Alcohols, Amides Amines, and Esters

| 55 | Ahcowet RS (Arnold, Hoffman and Co.). | Sulfated fatty acid ester. | 190 | ------ | 300 |
| 56 | Alipal CO-436 (General Dyestuff Corp.). | Ammonium salt of sulfate ester of an alkyl phenoxy polyoxyethylene ethanol. | 160 | ------ | 20 |
| 57 | Alkamine D (Amalgamated Chemical Corp.). | Sulfated fatty alcohol. | 200 | 160 | 105 |
| 58 | Avitex AD (E.I. du Pont de Nemours & Co.). | Sulfated alcohol derivative. | 135 | 165 | 205 |
| 59 | Carbase Emulsifier (Carlisle Chemical Inc.). | Sulfonated petroleum base. | 210 | ------ | 245 |
| 60 | Compound 8-5 (Johnson-March Corp.). | Sodium salt of an alkyl sulfonic acid. | 145 | ------ | 300 |
| 61 | Dergon T (Arkansas Co.). | Fatty acid ester sulfate. | 250 | ------ | 140 |
| 62 | Dianol 20 (Quaker Chemical Products Inc.). | Ester sulfate. | 190 | ------ | 300 |
| 63 | Duponol OS (E.I. du Pont de Nemours & Co.). | Fatty alcohol amine sulfate. | 134 | 79 | 52 |
| 64 | Dynesol F-20 (Amalgamated Chemical Corp.). | Sulfonated polyester of an aliphatic alcohol. | 240 | ------ | 255 |
| 65 | EmKapon K (Emkay Chemical Co.). | Amide sulfonate. | 255 | ------ | 255 |
| 66 | Estersulf X (Maher Color & Chemical Co.) | Alkane sulfonamide. | 255 | ------ | 255 |

SURFACE ACTIVE AGENT—Continued

| No. | Trade name | Chemical composition | Emulsion time (seconds) 100 | 500 | 1,000 |
|---|---|---|---|---|---|
| 67 | Mirapon RK Conc. (Miranol Chemical Co.). | Sulfonated fatty acid amide mixed with an alkyl aryl sulfonate. | 115 | 66 | 55 |
| 68 | Miranol LF Liquid Conc. (Miranol Chemical Co.). | A polyamine derivative of a sulfonated fatty acid amide. | 196 | ------ | 300 |
| 69 | Nopco 2031 (Nopco Chemical Co.). | Sulfated hydroxy stearic acid. | 300 | ------ | ------ |
| 70 | Orvus K (Proctor & Gamble Distributing Co.). | Modified alkyl sulfate. | 210 | ------ | 270 |
| 71 | Petrowet R (E.I. du Pont de Nemours & Co.). | Saturated hydrocarbon sulfonate. | 170 | 116 | 92 |
| 72 | SD-70 (Laurel Soap Mfg. Co.). | Ester sulfate. | 300 | ------ | 300 |
| 73 | Sipon LT-6 (American Alcolac Corp.). | Triethanolamine salt of lauryl alcohol sulfate. | 95 | 48 | 36 |
| 74 | Sipon L-22 (American Alcolac Corp.). | Ammonium salt of lauryl alcohol sulfate. | 158 | 69 | 41 |
| 75 | Stepanol B-153 (Stepan Chemical Co.). | Ammonium alkyl phenoxy polyoxyethylene sulfate. | 165 | ------ | 195 |
| 76 | Sulframin DR (Ultra Chemical Works). | Sodium salt of an hydroxy alkyl amido alcohol sulfate. | 156 | 158 | 138 |
| 77 | Synthogel (Synthron Inc.). | Sodium salt of a substituted amido-ethyl sulfonate. | 159 | 153 | 166 |
| 78 | Tergenol G (Hart Products Corp.). | A modified alkyl sulfate. | 193 | ------ | 240 |
| 79 | Tergitol 08 (Carbon and Carbide Chemicals Co.). | Sodium sulfate derivative of ethyl hexanol. | 170 | ------ | 160 |
| 80 | Trepenol T-100 (Treplow Products Inc.). | Triethanolamine salt of a sulfated alkyl phenoxy polyoxyethylene ether. | 160 | 205 | 223 |
| 81 | Warcolene W (Warwick Chemical Co. Dv. Sun Chemical Corp.). | Sulfated fatty acid ester. | 220 | ------ | 225 |

Miscellaneous

| 82 | Alkagel (Amalgamated Chemical Corp.). | Sodium oleyl taurine. | 200 | ------ | 300 |
| 83 | Alrodyne 315 (Alrose Chemical Co.). | Polyethylene glycol fatty esters. | 160 | ------ | 300 |
| 84 | Nil | Diethanolamine. | 220 | ------ | 200 |
| 85 | Estronon Gel Conc. (Trilon Chemicals Ltd.). | Sodium oleyl methyl tauride. | 210 | ------ | 205 |
| 86 | Igepon CN-42 (General Dyestuff Corp.). | Sodium N-cyclohexyl N-palmitoyl taurate. | 167 | ------ | 40 |
| 87 | Marasperse CE (Marathon Corp.). | Calcium lignosulfate. | 265 | ------ | 300 |
| 88 | Mercin H (Sun Chemical Co.). | Phosphorated complex alcohol. | 285 | ------ | 300 |
| 89 | Miranol SM Conc. (Miranol Chemical Co.). | Highly complex amino sodium fatty acid. | 195 | ------ | 300 |
| 90 | Moropon AC (Moretex Chemical Products). | Alkyl phenyl plus oleyl taurate. | 265 | ------ | 300 |
| 91 | Protenol KX (Continental Chemical Co.). | Protein condensate. | 220 | ------ | 300 |
| 92 | SD-200 (E. I. du Pont de Nemours & Co.). | Amine condensate. | 255 | ------ | 265 |
| 93 | Sellogen Conc. (Jacques Wolf & Co.). | Methyl taurine condensate. | 235 | ------ | 205 |
| 94 | Sotex N (Synthetic Chemicals Inc.). | Long chain fatty acid esters. | 300 | ------ | ------ |
| 95 | Sotex 334 (Synthetic Chemicals Inc.). | ---do--- | 165 | ------ | 300 |
| 96 | Tamol N (Rohm & Haas Co.). | Sodium salt of a condensed sulfonic acid. | 156 | ------ | 190 |
| 97 | Wetsit W-1086 M (Jacques Wolf & Co.). | Salt and solvent-free concentrated alkyl aryl type. | 255 | ------ | 155 |

It is seen from the above table that a limited number of agents represented as Sipon LT-6, Sipon L-22, and Mirapon RK Conc. are suitable for use an anti-emulsion agents in the system containing a copper ion solvent of the type comprising an ammoniacal solution of copper ions with an anion capable of forming cuprous salts soluble in such ammoniacal solution, for example, a copper ammonium acetate solvent and $C_4$ hydrocarbons, particularly a mixture of butadiene-1,3, n-butylenes, isobutylene and butanes. Such agents may be classified broadly as anionic surface active agents derived from a fatty acid having 5-25 carbon atoms and a maximum of 3 olefinic linkages and of the group consisting of fatty alcohol amine sulfates, nitrogen-containing salts of an alcohol sulfate and sulfonated fatty acid amide derivatives, particularly those in admixture with an aryl alkyl sulfonate.

Mirapon RK Conc. has been referred to heretofore by trade name only. Accordingly, the infra-red spectrum for Mirapon RK Conc. was obtained. The other two trade named products, Sipon LT6 and Sipon L22 are already completely identified. The spectrum is shown in the drawings in FIG. 1. The spectrum was obtained using a Beckman IR-3 spectrophotometer with the sample prepared by mixing 0.005 gram of solid with 1.50 grams of KBr. Characteristic absorption bands are exhibited at about the following wave-lengths: an NH or OH absorption band at 3.0 microns, phenyl absorption at 3.2 microns, aliphatic CH at 3.4 and 6.8 microns, a possible amide carbonyl near 6.0 microns, an aromatic and/or C=C group at about 6.2 microns, an aromatic group at about 6.3 microns, an NH group near 6.5 microns, an aromatic group such as a phenyl group at 6.6 microns, a phenyl OH group or epoxide group or both at about 8.0 and 8.8 microns, a possible $SO_3H$ group at 8.3–8.7 and 9.5–9.7 microns, and a paraphenyl and/or epoxide and/or C=C group at about 11.0 and 12.3 microns. The band at about 9.1 microns could be due to an electrolyte such as sodium sulphate which is usually present in such compositions.

EXAMPLE I

A series of tests was carried out, in which aqueous copper ammonium acetate solvent containing varying amounts of dissolved anti-emulsion being tested was mixed with and subsequently separated from hydrocarbon mixtures containing varying concentrations of butadiene-1,3, under the standard conditions of test I. The results obtained are summarized in Tables II, III and IV.

TABLE II

*Butadiene-1,3 Concentration in Hydrocarbon Phase— 0.2 Mol Percent*

| Concentration of compound, p.p.m. | 100 | 500 | 1,000 |
|---|---|---|---|
| Compound | Emulsion time (seconds) | | |
| Sipon LT-6 (triethanolamine salt of lauryl alcohol sulfate) | 94 | 48 | 36 |
| Sipon L-22 (ammonium salt of lauryl alcohol sulfate) | 158 | 69 | 41 |
| Mirapon RK conc. (mixture of sulfonated fatty acid amide plus aryl alkyl sulfonate) | 115 | 65 | 51 |

The emulsion time in the absence of any anti-emulsion agent was 220 seconds.

TABLE III

*Butadiene-1,3 Concentration in Hydrocarbon Phase— 22.0 Mol Percent*

| Concentration of compound, p.p.m. | 100 | 500 | 1,000 |
|---|---|---|---|
| Compound | Emulsion time (seconds) | | |
| Sipon LT-6 | 104 | 83 | 65 |
| Sipon L-22 | 117 | 62 | 45 |
| Mirapon RK Conc | 162 | 125 | 112 |

Emulsion time in the absence of any anti-emulsion agent was 220 seconds.

TABLE IV

*Butadiene-1,3 Concentration in Hydrocarbon Phase— 82.0 Mol Percent*

| Concentration of compounds, p.p.m. | 100 | 200 | 500 | 600 | 1,000 |
|---|---|---|---|---|---|
| Compound | Emulsion time (seconds) | | | | |
| Sipon LT-6 | 195 | 175 | 135 | 135 | 110 |
| Sipon L-22 | 150 | 125 | 90 | 85 | 75 |
| Mirapon RK Conc | 440 (220) | 400 (180) | 295 (130) | 270 (120) | 225 (100) |

Emulsion time in the absence of any anti-emulsion agent: for Mirapon RK Conc.—490 seconds; for others—220 seconds.

It should be noted that there are two values of emulsion time shown for Mirapon RK Conc. in Table IV. This is due to the fact that the emulsion time for the solvent used with the Mirapon RK Conc. was 490 seconds in the absence of anti-emulsion agent, while the solvent used with the other agents has an emulsion time of 220 seconds in the absence of any anti-emulsion agent. Accordingly, the values obtained for Mirapon RK Conc. in Table III were multipled by the factor $$\frac{220}{490}$$

in order to obtain a value which could be compared with those obtained with a solvent having an emulsion time of 220 seconds. The adjusted values are shown in parentheses.

The anti-emulsion agents tested in this example were Sipon LT-6 Sipon L-22 and Mirapon RK Conc. since these were the only anti-emulsion agents found to be successful in this particular extraction process, as seen from the results in Table I.

It should be stressed that the use of compounds as anti-emulsion agents which increase the emulsion time at any point of the extraction process is undesirable since such increase is indicative of increased entrainment. Increased entrainment results in reduced operating efficiency because of the carry-over of hydrocarbon and/or solvent from one settler to the next. To reduce entrainment and carry-over, more time must be allowed to obtain a more complete separation of the hydrocarbon and aqueous phases in the settlers which, in turn, reduces the throughput of the process. Accordingly, it is only through the use of the particular anti-emulsion agents found to be useful in the presence of low, intermediate and high concentrations of hydrocarbon that the best and full advantages of the present invention are achieved.

EXAMPLE II

Mirapon RK, which is a surface active agent which was found to be suitable for the breaking of emulsions in the specific system herein studied, was then evaluated further, using concentrations in the range 0-3000 p.p.m. These tests were also performed using a mixture of $C_4$ hydrocarbons of varying composition. The results are shown in FIG. 2, which is a graph of the emulsion time, in seconds, versus the surface active agent concentration in p.p.m. times 100.

EXAMPLE III

In the commercial scale continuous separation of butadiene-1,3 from admixture with n-butylene and other hydrocarbons using an ammoniacal copper solvent in a series of mixers and settlers in which the hydrocarbon phase and the butadiene rich solvent pass in opposite directions, there is a tendency toward emulsification and entrainment of butadiene-1,3 enriched solvent in the hydrocarbon phase. The desirability of using one of the anti-emulsion agents of the present invention in such a system was tested. The particular agent tested was Mirapon RK Conc.

For a constant feed rate to such a mixer-settler system, entrainment is evidenced by an increase in the flow rate of the hydrocarbon phase from the settlers. The effect of Mirapon RK Conc. addition was tested by observing the hydrocarbon flow rate from the first settler in the direction of hydrocarbon flow from the point of addition of solvent and the impure butadiene-1,3 stream to the system. When this rate was high enough that it appeared an undesirable amount of entrainment was occurring, ten gallons of an 18 percent solution of Mirapon in water were added. For a few minutes the entrainment became more severe, after which it decreased remarkably as shown in Table V.

TABLE V

*Reduction of Entrainment by Mirapon*

| Run No. | Initial hydrocarbon flow rate, lbs./hr. | Hydrocarbon flow rate after Mirapon addition, lbs./hr. |
|---|---|---|
| 1 | 128,000 | 83,000 |
| 2 | 121,000 | 88,000 |

However, it was found that the Mirapon RK Conc. was gradually lost from the system so that entrainment increased again very slowly. In practice, it has been found that at low feed rates entrainment is not a problem but, during periods of high production, it may be desirable to add such anti-emulsion agent daily.

The data of Table V show the very marked reduction in entrainment when Mirapon is used to reduce emulsification.

What we claim is:

1. In the process of separating a conjugated diolefin from a liquid mixture of such conjugated diolefin and other olefinic and saturated hydrocarbons and which includes the steps of intimately mixing the hydrocarbon mixture with a solvent comprising an aqueous ammoniacal solution of a copper salt comprising an anion capable of forming cuprous salts soluble in said ammoniacal solution; and allowing the mixture to separate into a liquid hydrocarbon phase and a diolefin-enriched liquid solvent phase in a settler tank, the improvement which comprises effecting such separation in the presence of an anionic surface active agent selected from the group consisting of the ammonium salt of lauryl alcohol sulfate, the triethanolamine salt of lauryl alcohol sulfate and a mixture comprising a sulfonated fatty acid amide admixed with an alkyl aryl sulfonate, said mixture exhibiting characteristic absorption bands in the infra-red region of the spectrum when suspended in solid potassium bromide at about the following wave-lengths expressed in microns: 3.0, 3.2, 3.4, 6.0, 6.2, 6.3, 6.5, 6.6, 6.8, 8.0, 8.3–8.7, 8.8, 9.5–9.7, 11.0 and 12.3.

2. In the process of separating butadiene-1,3 from a liquid mixture of butadiene-1,3 and other olefinic and saturated hydrocarbons and which includes the steps of intimately mixing the hydrocarbon mixture with an aqueous copper ammonium acetate solvent and allowing the mixture to separate into a liquid hydrocarbon phase and a liquid butadiene-1,3 enriched solvent phase in a settler tank, the improvement which comprises effecting such separation in the presence of a mixture comprising a sulfonated fatty acid amide admixed with an alkyl aryl sulfonate, said mixture exhibiting characteristic absorption bands in the infra-red region of the spectrum when suspended in solid potassium bromide at about the following wave lengths expressed in microns: 3.0, 3.2, 3.4, 6.0, 6.2, 6.3, 6.5, 6.6, 6.8, 8.0, 8.3–8.7, 8.8, 9.5–9.7, 11.0 and 12.3.

3. In the process of separating butadiene-1,3 from a liquid mixture of butadiene-1,3, n-butylene, isobutylene and butane and which includes the steps of intimately mixing the hydrocarbon mixture with an aqueous copper ammonium acetate solvent and allowing the mixture to separate into a liquid butadiene-1,3 enriched aqueous solvent phase and a liquid hydrocarbon phase, the improvement which comprises effecting such separation in the presence of an anionic surface active agent which is effective as an anti-emulsion agent in the presence of high and low concentrations of butadiene-1,3 in the presence of said aqueous copper ammonium acetate solvent, said surface active agent being a mixture comprising a sulfonated fatty acid amide admixed with an alkyl aryl sulfonate, said mixture exhibiting characteristic absorption bands in the infra-red region of the spectrum when suspended in solid potassium bromide at about the following wave lengths expressed in microns: 3.0, 3.2, 3.4, 6.0, 6.2, 6.3, 6.5, 6.6, 6.8, 8.0, 8.3–8.7, 8.8, 9.5–9.7, 11.0 and 12.3.

4. The process of claim 3 wherein the surface active agent has an infra-red absorption spectrum in which the absorptivity maxima occur at exactly the same wave lengths as those appearing in FIGURE 1, when measured on a sample prepared by mixing 0.005 part by weight of the surface active agent with 1.50 parts by weight of potassium bromide.

5. In the process of separating butadiene-1,3 from a liquid mixture of butadiene-1,3 and other olefinic and saturated hydrocarbons and which includes the steps of intimately mixing the hydrocarbon mixture with an aqueous copper ammonium acetate solvent and allowing the mixture to separate into a liquid hydrocarbon phase and a liquid butadiene-1,3 enriched solvent phase in a settler tank, the improvement which comprises effecting such separation in the presence of the ammonium salt of lauryl alcohol sulfate.

6. In the process of separating butadiene-1,3 from a liquid mixture of butadiene-1,3 and other olefinic and saturated hydrocarbons and which includes the steps of intimately mixing the hydrocarbon mixture with an aqueous copper ammonium acetate solvent and allowing the mixture to separate into a liquid hydrocarbon phase and a liquid butadiene-1,3 enriched solvent phase in a settler tank, the improvement which comprises effecting such separation in the presence of the triethanolamine salt of lauryl alcohol sulfate.

7. In the process of separating butadiene-1,3, from a mixture of butadiene-1,3, n-butylene, isobutylene, and butanes and which includes the steps of intimately mixing the hydrocarbon mixture with an aqueous copper ammonium acetate solvent and allowing the mixture to separate into a butadiene-1,3-enriched aqueous solvent phase and a hydrocarbon phase, the improvement which comprises effecting such separation in the presence of an anionic surface active agent which is effective as an anti-emulsion agent in the presence both of high and of low concentrations of butadiene-1,3 in the presence of said aqueous copper ammonium acetate solvent, said surface active agent being the ammonium salt of lauryl alcohol sulfate.

8. In the process of separating butadiene-1,3, from a mixture of butadiene-1,3, n-butylene, isobutylene, and butanes and which includes the steps of intimately mixing the hydrocarbon mixture with an aqueous copper ammonium acetate solvent and allowing the mixture to separate into a butadiene-1,3-enriched aqueous solvent phase and a hydrocarbon phase, the improvement which comprises effecting such separation in the presence of an anionic surface active agent which is effective as an anti-emulsion agent in the presence both of high and of low concentrations of butadiene-1,3 in the presence of said aqueous copper ammonium acetate solvent, said surface active agent being the triethanolamine salt of lauryl alcohol sulfate.

References Cited in the file of this patent

UNITED STATES PATENTS 2,411,105    Nixon et al.    Nov. 12, 1946
2,884,474    Finigan et al.    Apr. 28, 1959